(12) United States Patent
Hiratsuka

(10) Patent No.: US 12,166,205 B2
(45) Date of Patent: Dec. 10, 2024

(54) POSITIVE ELECTRODE ACTIVE SUBSTANCE FOR NON-AQUEOUS ELECTROLYTE SECONDARY CELL, AND NON-AQUEOUS ELECTROLYTE SECONDARY CELL

(71) Applicant: Panasonic Intellectual Property Management Co., Ltd., Osaka (JP)

(72) Inventor: Hidekazu Hiratsuka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 958 days.

(21) Appl. No.: 16/973,892

(22) PCT Filed: Mar. 15, 2019

(86) PCT No.: PCT/JP2019/010724
§ 371 (c)(1),
(2) Date: Dec. 10, 2020

(87) PCT Pub. No.: WO2020/003642
PCT Pub. Date: Jan. 2, 2020

(65) Prior Publication Data
US 2021/0265627 A1     Aug. 26, 2021

(30) Foreign Application Priority Data
Jun. 29, 2018   (JP) ................................. 2018-124150

(51) Int. Cl.
*H01M 4/525*     (2010.01)
*H01M 4/02*     (2006.01)
*H01M 4/505*     (2010.01)

(52) U.S. Cl.
CPC ........... *H01M 4/525* (2013.01); *H01M 4/505* (2013.01); *H01M 2004/028* (2013.01)

(58) Field of Classification Search
CPC . H01M 4/525; H01M 4/505; H01M 2004/028
See application file for complete search history.

(56) References Cited

U.S. PATENT DOCUMENTS

| | | | |
|---|---|---|---|
| 2010/0081055 A1* | 4/2010 | Konishi | H01M 10/0525 429/223 |
| 2011/0129734 A1* | 6/2011 | Konishi | H01M 10/0525 429/223 |

(Continued)

FOREIGN PATENT DOCUMENTS

| | | |
|---|---|---|
| JP | 2011-113825 A | 6/2011 |
| JP | 2014-149962 A | 8/2014 |

(Continued)

OTHER PUBLICATIONS

International Search Report dated Nov. 6, 2019, issued in counterpart Application No. PCT/JP2019/010724. (1 page).

*Primary Examiner* — Brian R Ohara
*Assistant Examiner* — Michelle T Leonard
(74) *Attorney, Agent, or Firm* — WHDA, LLP

(57) ABSTRACT

A positive electrode active substance, wherein: the average primary particle diameter of an Ni-containing lithium complex oxide A is 0.5 μm or greater, and is greater than the average primary particle diameter (0.05 μm or greater) of an Ni-containing lithium complex oxide B; and the average secondary particle diameter of the Ni-containing lithium complex oxide A is 2-6 μm, and is less than the average secondary particle diameter (10-20 μm) of the Ni-containing lithium complex oxide B. The Ni-containing lithium complex oxides A, B contain 55 mol % or more of Ni relative to the total mol of metal elements excluding Li, have a crystallite diameter of 100-200 nm, and are such that the disorder of elemental Ni is 3% or less.

8 Claims, 4 Drawing Sheets

(56) References Cited

U.S. PATENT DOCUMENTS

2015/0188136 A1\* 7/2015 Mori .................. H01M 4/525
                                                                                    429/223
2017/0187031 A1\* 6/2017 Kurita ................ H01M 4/525
2017/0288223 A1 10/2017 Ogawa et al.

FOREIGN PATENT DOCUMENTS

| JP | 2017-188445 A | 10/2017 |
| WO | 2014/010448 A1 | 1/2014 |

\* cited by examiner

POSITIVE ELECTRODE ACTIVE SUBSTANCE FOR NON-AQUEOUS ELECTROLYTE SECONDARY CELL, AND NON-AQUEOUS ELECTROLYTE SECONDARY CELL

TECHNICAL FIELD

The present disclosure relates to a positive electrode active material for a non-aqueous electrolyte secondary battery, and a non-aqueous electrolyte secondary battery.

BACKGROUND ART

As a positive electrode active material for a non-aqueous electrolyte secondary battery significantly contributing to a larger capacity of batteries, Ni-containing lithium composite oxides having a high Ni content have attracted an attention recently. Positive electrodes employing two positive electrode active materials each having a different average particle size in combination have also been known (e.g., see Patent Literature 1). In this case, a combination of a large particle and a small particle between which the particle-size difference is large can enhance the packing density of the active material in the positive electrode mixture layer to thereby achieve a larger capacity of the battery.

CITATION LIST

Patent Literature

PATENT LITERATURE 1: Japanese Unexamined Patent Application Publication No. 2011-113825

SUMMARY

Incidentally, a small particle-sized positive electrode active material has a large specific surface area. Thus, good storage and durability characteristics are not easily achieved in non-aqueous electrolyte secondary batteries employing such an active material. Meanwhile, attempts to enlarge primary particles of the active material in order to reduce the surface area of the small particle-sized positive electrode active material have been conducted, but no positive electrode active material that satisfies the required battery performance has been obtained. For example, when the firing temperature during synthesis is raised in order to make the primary particle have a larger diameter, the capacity and output characteristics significantly decrease. Particularly, in a Ni-containing lithium composite oxide having a high Ni content, performance degradation increases in association with a larger diameter of the primary particles.

It is an advantage of the present disclosure to provide a positive electrode active material that can achieve a non-aqueous electrolyte secondary battery having a high capacity, being excellent in output characteristics, and having good cyclic characteristics and storage characteristics.

A positive electrode active material for a non-aqueous electrolyte secondary battery according to one aspect of the present disclosure is a positive electrode active material including Ni-containing lithium composite oxides A and B, wherein the average primary particle size of the Ni-containing lithium composite oxide A is 0.5 μm or more and is larger than the average primary particle size of the Ni-containing lithium composite oxide B, the average secondary particle size of the Ni-containing lithium composite oxide A is 2 μm to 6 μm and is smaller than the average secondary particle size of the Ni-containing lithium composite oxide B, the Ni-containing lithium composite oxide B has an average primary particle size of 0.05 μm or more and an average secondary particle size of 10 μm to 20 μm, and the Ni-containing lithium composite oxides A and B contain 55 mol % or more of Ni based on the total number of moles of the metal elements except for Li, have a crystallite size of 100 nm to 200 nm, and have a Ni element disorder determined by an X-ray diffraction method of 3% or less.

A non-aqueous electrolyte secondary battery according to one aspect of the present disclosure comprises a positive electrode including the above positive electrode active material, a negative electrode, and a non-aqueous electrolyte.

According to the positive electrode active material of one aspect of the present disclosure, it is possible to provide a non-aqueous electrolyte secondary battery having a high capacity, being excellent in output characteristics, and having good cyclic characteristics and storage characteristics.

DESCRIPTION OF EMBODIMENTS

Figure 1:
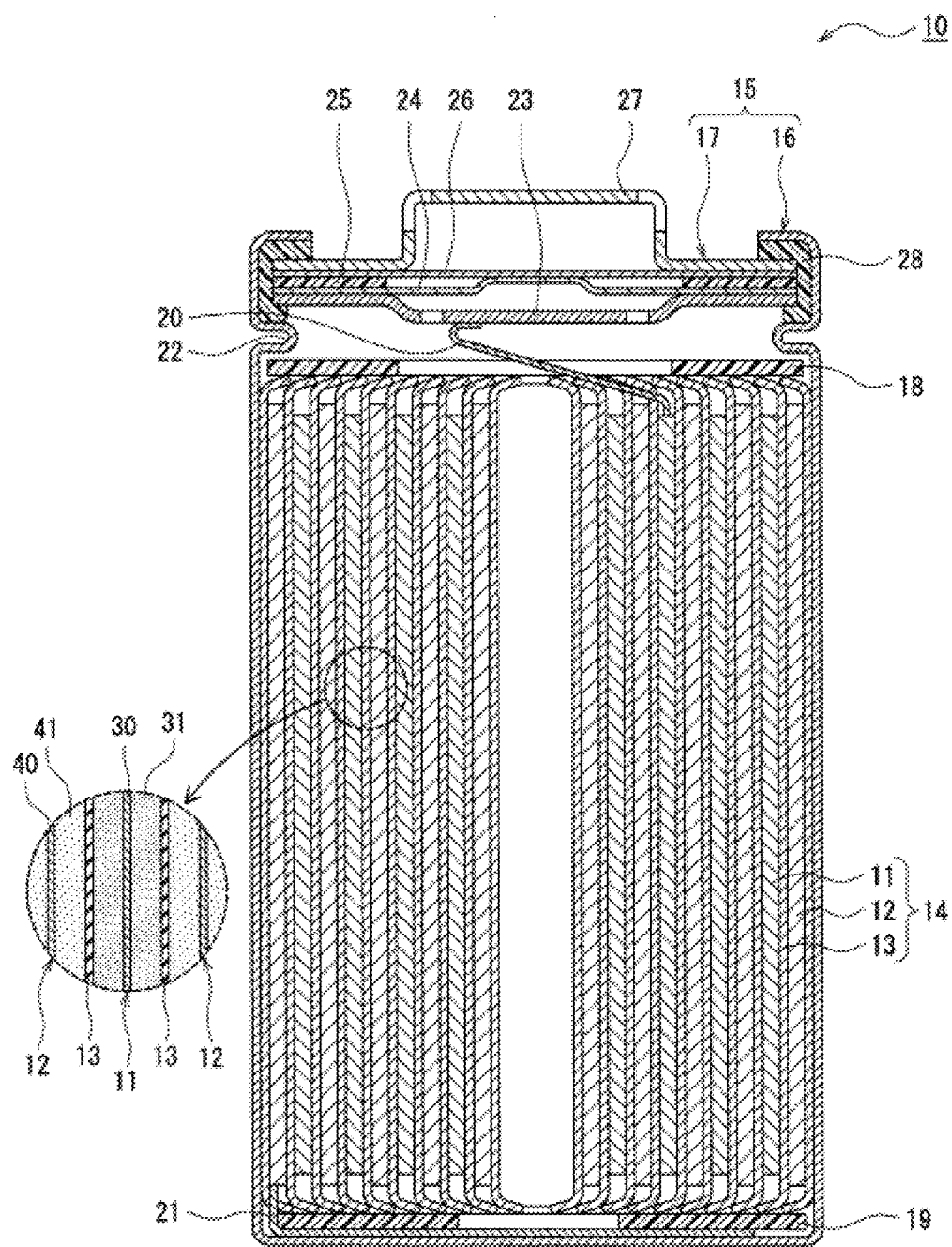
FIG. 1 is a sectional view of a non-aqueous electrolyte secondary battery, which is one example of the embodiment.

As mentioned above, a Ni-containing lithium composite oxide having a high Ni content greatly contributes to a larger capacity of a battery, but it is not easy to make its primary particles have a larger diameter to thereby reduce the surface area thereof while a high capacity and good output characteristics are maintained. As a result of earnest studies, the present inventor has succeeded in obtaining a Ni-containing lithium composite oxide A having a large primary particle size, a small secondary particle size, and a Ni content of 55 mol % or more. Controlling the crystallite size to 100 nm to 200 nm and the Ni element disorder to 3% or less in the Ni-containing lithium composite oxide A stabilizes the crystal structure and enhances the lithium ion conductivity, for example. Accordingly, it is considered that good storage and durability characteristics can be obtained as well as decrease in the capacity and output characteristics is prevented.

Then, mixing the Ni-containing lithium composite oxide A and a Ni-containing lithium composite oxide B having a primary particle size smaller than that of the oxide A and a secondary particle size larger than that of the oxide A at a predetermined mass ratio can raise the packing density of the active material in the positive electrode mixture layer to thereby make the capacity of a battery larger. In other words, using the Ni-containing lithium composite oxide B in combination can provide a positive electrode having a packing density that cannot be accomplished only by the Ni-containing lithium composite oxide A. It is difficult to accomplish good storage and durability characteristics by using only the Ni-containing lithium composite oxide B. In other words, combining the Ni-containing lithium composite oxides A and B can accomplish a non-aqueous electrolyte secondary battery having a high capacity, being excellent in output characteristics, and having good cyclic characteristics and storage characteristics.

Here, the Ni element disorder means the contamination ratio of the Ni element in lithium sites in the crystal structure. For example, in a Ni-containing lithium composite oxide having a layered structure, the Ni element disorder is the proportion of nickel ions contaminating 3$a$ sites to be occupied by lithium ions, when denoted by a Wyckoff symbol.

Hereinafter, one example of the embodiment of the positive electrode active material and the non-aqueous electrolyte secondary battery according to the present disclosure will be described in detail.

In the embodiment described hereinafter, a cylindrical battery in which an electrode assembly having a wound structure 14 is housed in a cylindrical battery case 15 is exemplified. The battery case, which is not limited to cylindrical, may be of rectangular, coin-shaped, or the like or may be a battery case constituted by a laminate sheet including a metal layer and a resin layer. The electrode assembly may not be limited to the wound structure and may be a laminate-type electrode assembly formed by alternately laminating a plurality of positive electrodes and a plurality of negative electrodes with separators therebetween.

FIG. 1 is a sectional view of a non-aqueous electrolyte secondary battery 10, which is one example of the embodiment. As exemplified in FIG. 1, the non-aqueous electrolyte secondary battery 10 comprises a wound-type electrode assembly 14, a non-aqueous electrolyte (not shown), and a battery case 15 that houses the electrode assembly 14 and the non-aqueous electrolyte. The electrode assembly 14 has a wound structure in which a positive electrode 11 and a negative electrode 12 are wound together with a separator 13 therebetween. The battery case 15 is composed of a bottomed cylindrical exterior can 16 and a sealing assembly 17 blocking the opening of exterior can 16. The non-aqueous electrolyte secondary battery 10 also comprises a resin gasket 28 disposed between the exterior can 16 and sealing assembly 17.

The electrode assembly 14 is constituted by the elongate positive electrode 11, the elongate negative electrode 12, the two elongate separators 13, a positive electrode tab 20 bonded to the positive electrode 11, and a negative electrode tab 21 bonded to the negative electrode 12. The negative electrode 12 is formed to have slightly larger dimensions than those of the positive electrode 11 in order to prevent precipitation of lithium. In other words, the negative electrode 12 is formed longer in the longitudinal direction and the width direction (lateral direction) than the positive electrode 11. The two separators 13 are formed to have at least slightly larger dimensions than those of the positive electrode 11 and are disposed to sandwich the positive electrode 11, for example.

Insulating plates 18 and 19 are each disposed above and under the electrode assembly 14. In the example shown in FIG. 1, the positive electrode tab 20 attached to the positive electrode 11 extends through a through-hole in the insulating plate 18 to the side of the sealing assembly 17, and the negative electrode tab 21 attached to the negative electrode 12 extends outside the insulating plate 19 to the side of the bottom of the exterior can 16. The positive electrode tab 20 is connected to the lower surface of the bottom plate 23 of the sealing assembly 17, by means of welding or the like. The cap 27, which is the top plate of the sealing assembly 17 electrically connected to the bottom plate 23, serves as the positive electrode terminal. The negative electrode tab 21 is connected to the inner surface of the bottom of the exterior can 16 by means of welding or the like, and the exterior can 16 serves as the negative electrode terminal.

The exterior can 16 is, for example, a bottomed cylindrical metal container. As mentioned above, the gasket 28 is provided between the exterior can 16 and the sealing assembly 17 to seal the inner space of the battery case 15. The exterior can 16 has a grooved portion 22 to support the sealing assembly 17, the grooved portion being formed by externally pressing the portion of the side wall, for example. The grooved portion 22 is preferably annularly formed along the peripheral direction of the exterior can 16, supporting the sealing assembly 17 by the upper surface thereof. The upper end of the exterior can 16 is folded inwardly and crimped around the peripheral edge of the sealing assembly 17.

The sealing assembly 17 has a structure in which the bottom plate 23, a lower vent member 24, an insulating member 25, an upper vent member 26, and the cap 27 are layered, in the order presented, from the side of the electrode assembly 14. The members constituting the sealing assembly 17 each have, for example, a disk shape or a ring shape, and the members except for the insulating member 25 are each electrically connected to one another. The lower vent member 24 and the upper vent member 26 are connected at each center part, and the insulating member 25 is interposed between the peripheral edges of the vent members. When the internal pressure of the battery rises due to abnormal heat generation, the lower vent member 24 deforms and breaks so as to push up the upper vent member 26 toward the side of the cap 27, and the current path between the lower vent member 24 and the upper vent member 26 is disconnected. When the internal pressure further increases, the upper vent member 26 breaks, and gas is emitted from the opening of the cap 27.

Hereinafter, the positive electrode 11, the negative electrode 12, the separator 13, and the non-aqueous electrolyte constituting the non-aqueous electrolyte secondary battery 10, particularly a positive electrode active material will be described in detail.

[Positive Electrode]

The positive electrode 11 has a positive electrode current collector 30 and a positive electrode mixture layer 31 formed on both the surfaces of the positive electrode current collector 30. Foil of a metal that is stable in the electric potential range of the positive electrode 11 such as aluminum and an aluminum alloy, a film with such a metal disposed as an outer layer, and the like can be used for the positive electrode current collector 30. The positive electrode mixture layer 31 includes a positive electrode active material, a conductive agent, and a binder. The thickness of the positive electrode mixture layer 31 is 10 µm to 150 µm, for example, on one side of the current collector. The positive electrode 11 can be produced by coating a positive electrode mixture slurry including a positive electrode active material, a conductive agent, a binder, and the like on the positive electrode current collector 30, drying the coating, and compressing the dried coating to form the positive electrode mixture layer 31 on both the surfaces of the positive electrode current collector 30.

The positive electrode mixture layer 31 includes Ni-containing lithium composite oxides A and B, which are two composite oxides each having a different average primary particle size and average secondary particle size, as a positive electrode active material. The Ni-containing lithium composite oxides A and B are composite oxides containing at least Li and Ni. The positive electrode mixture layer 31 may include other positive electrode active material than the Ni-containing lithium composite oxides A and B as long as objects of the present disclosure are not compromised, but in the present embodiment, only the Ni-containing lithium composite oxides A and B are included as the positive electrode active material.

Examples of the conductive agent included in the positive electrode mixture layer 31 include carbon materials such as carbon black, acetylene black, Ketjen black, and graphite. Examples of the binder included in the positive electrode mixture layer 31 include fluorine resins such as polytetrafluoroethylene (PTFE) and polyvinylidene fluoride (PVdF), polyacrylonitrile (PAN), polyimides, acrylic resins, and polyolefins. These resins may be combined with carboxymethyl cellulose (CMC) or a salt thereof, polyethylene oxide (PEO), or the like.

Figure 2A:
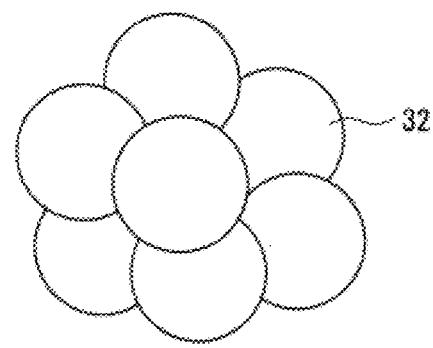
FIG. 2A is a schematic view illustrating a Ni-containing lithium composite oxide A as an exemplary embodiment.
Figure 2B:
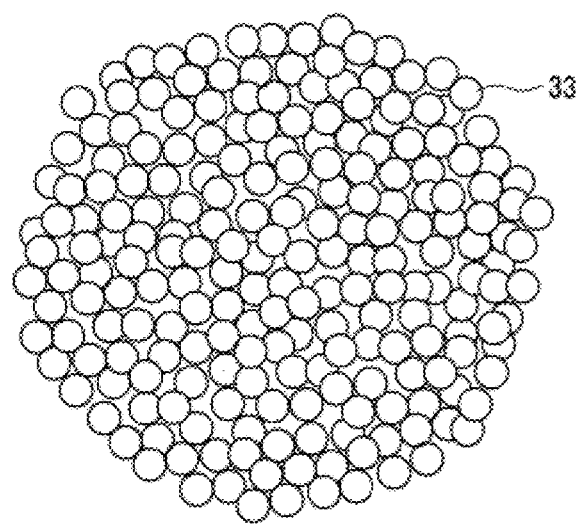
FIG. 2B is a schematic view illustrating a Ni-containing lithium composite oxide B as an exemplary embodiment.

FIG. 2A is a schematic view illustrating the Ni-containing lithium composite oxide A, and FIG. 2B is a schematic view illustrating the Ni-containing lithium composite oxide B. As shown in FIG. 2A and FIG. 2B, the Ni-containing lithium composite oxides A and B each are a secondary particle formed by aggregation of primary particles 32 and 33, respectively. The Ni-containing lithium composite oxide A (secondary particle) has a particle size smaller than that of the Ni-containing lithium composite oxide B (secondary particle). In contrast, the primary particles 32 constituting the Ni-containing lithium composite oxide A are larger than the primary particles 33 constituting the Ni-containing lithium composite oxide B. Combining the Ni-containing lithium composite oxides A and B can raise the packing density of the positive electrode active material in the positive electrode mixture layer 31 to thereby make the capacity of the battery larger while maintaining good storage and durability characteristics.

Both the Ni-containing lithium composite oxides A and B contain 55 mol % or more of Ni based on the total number of moles of the metal elements except for Li. The crystallite size is 100 nm to 200 nm, and the Ni element disorder determined by an X-ray diffraction method is 3% or less.

The Ni-containing lithium composite oxides A and B are composite oxides having a proportion of Ni is 55 mol % or more, preferably 70 mol % or more, and more preferably 80 mol % or more based on the total number of moles of the metal elements except for Li. The Ni-containing lithium composite oxides A and B may contain elements other than Li and Ni, and contain at least one element selected from Co, Mn, Mg, Zr, Mo, W, Al, Cr, V, Ce, Ti, Fe, Si, K, Ga, In, B, Ca, and Na, for example. The Ni-containing lithium composite oxides A and B contain at least one of Co and Mn, preferably contain Co, and contain at least one metal element selected from Mg, Zr, Mo, W, Al, Cr, V, Ce, Ti, Fe, K, Ga, In, and B.

One preferable example of the Ni-containing lithium composite oxides A and B is a composite oxide represented by the general formula $Li_\alpha Ni_x Co_y M_{(1-x-y)} O_2$, where $1.00 \leq \alpha \leq 1.15$, $0.8 \leq x < 1.0$, $0 \leq y \leq 0.3$, and M is an element other than Li, Ni, and Co. M in the formula is at least one element selected from, for example, Mn, Mg, Zr, Mo, W, Al, Cr, V, Ce, Ti, Fe, Si, K, Ga, In, B, Ca, and Na. The Ni-containing lithium composite oxides A and B may have the substantially same composition.

The average particle size of the primary particles 32 of the Ni-containing lithium composite oxide A (hereinafter, may be referred to as the "average primary particle size A") is 0.5 µm or more and larger than the average particle size of the primary particles 33 of the Ni-containing lithium composite oxide B (hereinafter, may be referred to as the "average primary particle size B"). On the other hand, the average particle size of the secondary particle of the Ni-containing lithium composite oxide A (hereinafter, also referred to as the "average secondary particle size A") is 2 µm to 6 µm and is smaller than the average particle size of the secondary particle of the Ni-containing lithium composite oxide B (hereinafter, may be referred to as the "average secondary particle size B"). The Ni-containing lithium composite oxide B has an average primary particle size B of 0.05 µm or more and an average secondary particle size of 10 µm to 20 µm. In this case, the capacity of the battery can be made to be larger while good storage and durability characteristics are maintained.

The average primary particle size A of the Ni-containing lithium composite oxide A is preferably 0.5 µm to 2 µm and more preferably 0.5 µm to 1.2 µm. The average primary particle size B of the Ni-containing lithium composite oxide B is preferably 0.05 µm to 0.5 µm and more preferably 0.05 µm to 0.2 µm. When the average primary particle sizes A and B are within the range, a higher capacity and an improvement in output characteristics are facilitated while good storage and durability characteristics are maintained.

The average primary particle sizes A and B can be determined by analyzing a cross-sectional SEM image observed with a scanning electron microscope (SEM). For example, the positive electrode is embedded into a resin, and a cross section of the positive electrode mixture layer is prepared by cross section polisher (CP) processing or the like. The cross section is imaged by an SEM. Alternatively, each powder of the Ni-containing lithium composite oxides A and B is embedded into a resin, and each particle cross section of the composite oxides is prepared by CP processing or the like. The cross section is imaged by an SEM. Then, 30 primary particles are randomly selected from this cross-sectional SEM image. The grain boundaries of 30 particles of the selected primary particles are observed, and the contour of the primary particles is identified. Then, the major axis (longest diameter) of each of the 30 primary particles is determined, and the average value thereof is taken as the average primary particle size A or B.

The average secondary particle sizes A and B can also be determined from the above cross-sectional SEM image. Specifically, 30 secondary particles (Ni-containing lithium composite oxide A or B) are randomly selected from the above cross-sectional SEM image. The grain boundaries of the selected 30 secondary particles are observed, and the contour of the secondary particles is identified. Then, the major axis (longest diameter) of each of the 30 secondary particles is determined, and the average value thereof is taken as the average particle size of the secondary particle.

The Ni element disorder to be obtained by an X-ray diffraction method on the Ni-containing lithium composite oxides A and B is 3% or less, preferably 2% or less, and more preferably 1% to 2%. In this case, the deterioration in the battery capacity and gas generation under a high-temperature environment can be sufficiently prevented. When the Ni element disorder exceeds 3%, the diffusibility of lithium ions decreases, the battery capacity decreases, and the crystal structure is unstabilized to thereby result in deterioration in the thermal stability and an increase in the amount of gas generated under a high-temperature environment.

The Ni element disorder can be obtained from Rietveld analysis results of X-ray diffraction patterns obtained from the X-ray diffraction method on the Ni-containing lithium composite oxides A and B. Specifically, a powder X-ray diffraction measurement apparatus (manufactured by Bruker AXS GmbH, trade name "D8ADVANCE") is used to measure an X-ray diffraction pattern of the composite oxides. Then, the Ni element disorder can be calculated from the X-ray diffraction pattern obtained using Rietveld analysis software TOPAS (manufactured by Bruker AXS).

X-ray diffraction measurement is conducted with a counting time: one second per step from 10° to 120° using a PSD (LYNX EYE) as the detector and CuKα1 (wavelength: 1.5418 Å) as the tube bulb at a tube voltage of 40 kV, a tube current of 40 mA, a slit width of 0.3°, and a step width of 0.03°.

The crystallite size of the Ni-containing lithium composite oxides A and B is 100 nm to 200 nm and preferably 120 nm to 180 nm. In this case, deterioration in the thermal stability and gas generation under a high-temperature environment can be sufficiently prevented. The crystallite size of the Ni-containing lithium composite oxides herein is the crystallite size in the (110) vector direction perpendicular to the (003) vector direction, which is the direction in which layers are stacked in a layered rock salt type crystal structure.

The crystallite size of the Ni-containing lithium composite oxides A and B can be calculated by analyzing an X-ray diffraction pattern obtained by the X-ray diffraction method with a whole powder pattern decomposition method (hereinafter, referred to as the "WPPD method").

The analysis procedure by the WPPD method is as follows.

Step 1: Start the software (TOPAS) and load measurement data.

Step 2: Set Emission Profile
(Select Cu tube bulb and Bragg Brentano focusing geometry).

Step 3: Set background
(Use Legendre's polynomial as Profile function, and set the number of terms to 8 to 20).

Step 4: Set Instrument
(Use Fundamental Parameter, and input Slit conditions, Filament length, and Sample length).

Step 5: Set Corrections
(Use Sample displacement. Use also Absorption if the sample packing density in the sample holder is low. In this case, fix Absorption to the linear absorption coefficient of the measurement sample).

Step 6: Set crystal structure
(Set to Space group R3-m. Use Lattice constant/Crystallite size/Lattice strain. Set profile broadening due to crystallite size and lattice strain to Lorentzian).

Step 7: Execute calculation
(Refine Background, Sample displacement, Diffraction intensity, Lattice constant, Crystallite size, and Lattice strain, and use the Le Bail method for calculation).

Step 8: End analysis if the standard deviation of the crystallite size is 6% or less of the refined value. Proceed to Step 9 if the standard deviation is greater than 6% of the refined value.

Step 9: Set Profile broadening due to lattice strain to Gaussian
(Keep Lorentzian for crystallite size).

Step 10: Execute calculation
(Refine Background, Sample displacement, Diffraction intensity, Lattice constant, Crystallite size, and Lattice strain).

Step 11: End analysis if the standard deviation of the crystallite size is 6% or less of the refined value. Analysis fails if the standard deviation is greater than 6% of the refined value.

The Ni-containing lithium composite oxide A is preferably included in an amount of preferably 5 to 55 mass %, more preferably 10 to 50 mass %, and particularly preferably 25 to 45 mass % based on the mass of the Ni-containing lithium composite oxide B. The mixing ratio of the Ni-containing lithium composite oxides A and B is within the range, the battery capacity, output characteristics, cyclic characteristics, and storage characteristics are likely to be all achieved. The Ni-containing lithium composite oxides A and B exist at a mass ratio of 0.5:9.5 to 5.5:4.5, 1:9 to 5:5, or 2.5:7.5 to 4.5:6.5. When the mass ratio of the Ni-containing lithium composite oxides A and B is within the range, the capacity of the battery can be made larger while good storage and durability characteristics are maintained.

Hereinafter, one example of a method for producing the Ni-containing lithium composite oxides A and B will be described in detail.

The Ni-containing lithium composite oxide A is synthesized via two-stage firing steps including a first firing step of firing a first mixture including a lithium compound and a transition metal compound containing 55 mol % or more and preferably 80 mol % or more of Ni, and a second firing step of firing a second mixture including the fired product obtained in the first firing step and a second mixture including a lithium compound. The Ni-containing lithium composite oxide B can be synthesized by a conventionally known method including a single-stage firing step and can be synthesized using the same raw material as those of the Ni-containing lithium composite oxide A.

<First Firing Step>

The content of Li in the first mixture is preferably 0.7 to 1.1 and more preferably 0.8 to 1.0 as a molar ratio based on the total amount of the transition metal. The firing temperature of the first mixture is preferably 700° C. to 1000° C. and more preferably 750° C. to 900° C. The firing time is, for example, 3 hours to 10 hours. When the content of Li in the first mixture, the firing temperature of the first mixture, and the like are within the ranges, adjustment of the average particle size of each of the primary particle size and the secondary particle, the Ni element disorder, and the crystallite size of the Ni-containing lithium composite oxide A within the above ranges is easily achieved.

Examples of the lithium compound contained in the first mixture include $Li_2CO_3$, $LiOH$, $Li_2O_3$, $Li_2O$, $LiNO_3$, $LiNO_2$, $Li_2SO_4$, $LiOH \cdot H_2O$, $LiH$, and $LiF$.

The transition metal compound contained in the first mixture is not particularly limited as long as being a compound containing 55 mol % or more and preferably 80 mol % or more of Ni, but is preferably a compound containing at least one of Co and Mn in addition to Ni in view of an improvement in the stability of the crystal structure of a Ni-containing lithium composite oxide to be finally obtained or the like.

<Second Firing Step>

The content of Li in the second mixture is preferably 0.01 to 0.3 and more preferably 0.05 to 0.2 as a molar ratio based on the total amount of the transition metal. The firing temperature of the second mixture is preferably 600° C. to 900° C. and more preferably 700° C. to 800° C. The firing time is, for example, 5 hours to 20 hours. When the content of Li in the first mixture, the firing temperature of the second mixture, and the like are within the ranges, adjustment of the average particle size of each of the primary particle size and the secondary particle, the Ni element disorder, and the crystallite size of the Ni-containing lithium composite oxide A within the above ranges is easily achieved. In the second firing step, firing is conducted at a lower temperature for a longer time than those in the first firing step.

The lithium compound contained in the second mixture may be the same or different from the lithium compound contained in the first mixture. Examples of thereof include $Li_2CO_3$, LiOH, $Li_2O_3$, $Li_2O$, $LiNO_3$, $LiNO_2$, $Li_2SO_4$, $LiOH \cdot H_2O$, $Li_3PO_4$, LiH, and LiF

[Negative Electrode]

The negative electrode 12 has a negative electrode current collector 40 and a negative electrode mixture layer 41 formed on both the surfaces of the negative electrode current collector 40. Foil of a metal that is stable in the electric potential range of the negative electrode 12, such as copper, a copper alloy, or the like, a film with such a metal disposed as an outer layer, and the like can be used for the negative electrode current collector 40. The negative electrode mixture layer 41 includes a negative electrode active material and a binder. The thickness of the negative electrode mixture layer 41 is 10 μm to 150 μm, for example, on one side of the current collector. The negative electrode 12 can be produced by coating a negative electrode mixture slurry including a negative electrode active material, a binder, and the like on the negative electrode current collector 40, drying the coating, and rolling the dried coating to form the negative electrode mixture layer 41 on both the surfaces of the negative electrode current collector 40.

The negative electrode active material is not particularly limited as long as being capable of reversibly intercalating and releasing lithium ions. A carbon material such as graphite is generally used. Graphite may be either of natural graphite such as flaky graphite, massive graphite, or earthy graphite or artificial graphite such as massive artificial graphite, or graphitized mesophase carbon microbeads. Alternatively, as the negative electrode active material, a metal to be alloyed with Li such as Si and Sn, a metal compound including Si, Sn, or the like, a lithium-titanium composite oxide, or the like may be used. For example, a Si-containing compound represented by $SiO_x$ ($0.5 \leq x \leq 1.6$), a Si-containing compound including Si particulates dispersed in a lithium silicate phase represented by $Li_{2y}SiO_{(2+y)}$ ($0<y<2$), or the like may be used in combination with graphite.

As the binder included in the negative electrode mixture layer 41, as in the case of the positive electrode 11, a fluorine-containing resin such as PTFE and PVdF, PAN, a polyimide, an acryl resin, a polyolefin, or the like may be used, but styrene-butadiene rubber (SBR) is preferably used. The negative electrode mixture layer 41 may also include CMC or a salt thereof, polyacrylic acid (PAA) or a salt thereof, polyvinyl alcohol (PVA), or the like. The negative electrode mixture layer 41 includes, for example, SBR and CMC or a salt thereof.

[Separator]

An ion-permeable and insulating porous sheet is used as the separator 13. Specific examples of the porous sheet include a microporous thin film, woven fabric, and nonwoven fabric. Suitable examples of the material for the separator include polyolefins such as polyethylene and polypropylene, and cellulose. The separator 13 may have a single-layer structure or may have a layered structure. On the surface of the separator 13, a layer of a resin having high heat resistance such as an aramid resin or a filler layer including an inorganic compound filler may be provided.

[Non-Aqueous Electrolyte]

The non-aqueous electrolyte includes a non-aqueous solvent and an electrolyte salt dissolved in the non-aqueous solvent. As the non-aqueous solvent, esters, ethers, nitriles such as acetonitrile, amides such as dimethylformamide, and mixed solvents of two or more thereof can be used. The non-aqueous solvent may contain a halogen-substituted product formed by replacing at least one hydrogen atom of any of the above solvents with a halogen atom such as fluorine. Examples of the halogen-substituted product include fluorinated cyclic carbonate esters such as fluoroethylene carbonate (FEC), fluorinated chain carbonate esters, and fluorinated chain carboxylate esters such as methyl fluoropropionate (FMP).

Examples of the esters include cyclic carbonate esters, such as ethylene carbonate (EC), propylene carbonate (PC), and butylene carbonate: chain carbonate esters, such as dimethyl carbonate (DMC), ethyl methyl carbonate (EMC), diethyl carbonate (DEC), methyl propyl carbonate, ethyl propyl carbonate, and methyl isopropyl carbonate: cyclic carboxylate esters such as γ-butyrolactone (GBL) and γ-valerolactone (GVL); and chain carboxylate esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as, 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxy benzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The electrolyte salt is preferably a lithium salt. Examples of the lithium salt include $LiBF_4$, $LiClO_4$, $LiPF_6$, $LiAsF_6$, $LiSbF_6$, $LiAlCH_4$, LiSCN, $LiCF_3SO_3$, $LiCF_3CO_2$, $Li(P(C_2O_4)F_4)$, $LiPF_{6-x}(C_nF_{2n+1})_x$ (where $1<x<6$, n is 1 or 2), $LiB_{10}Cl_{10}$, LiCl, LiBr, LiI, chloroborane lithium, lithium lower aliphatic carboxylate, borates such as $Li_2B_4O_7$ and $Li(B(C_2O_4)F_2)$, and imide salts such as $LIN(SO_2CF_3)_2$ and $LiN(C_1F_{2l+1}SO_2)(C_mF_{2m+1}SO_2)$ (where l and m are each an integer of 0 or more). These lithium salts may be used singly or two or more thereof may be mixed and used. Among these, $LiPF_6$ is preferably used in view of ionic conductivity, electrochemical stability, and other properties. The concentration of the lithium salt is, for example, 0.8 mol to 1.8 mol per 1 L of a non-aqueous solvent.

EXAMPLES

Hereinafter, the present disclosure will be further described with reference to examples, but the present disclosure is not intended to be limited to the following examples.

Example 1

[Synthesis of Ni-containing Lithium Composite Oxide A1]

LiOH and $Ni_{0.80}Co_{0.10}Mn_{0.10}(OH)_2$ were mixed such that the molar ratio of Li based on the total amount of Ni, Co, and Mn was 0.90. Thereafter, this mixture was maintained at 900° C. for 5 hours (first firing step) to thereby obtain a first fired product of a Ni-containing lithium composite oxide. Next, LiOH and the first fired product were mixed such that the molar ratio of Li based on the total amount of Ni, Co, and Mn was 0.15. This mixture was maintained at 750° C. for 10 hours (second firing step) to thereby obtain a Ni-containing lithium composite oxide (second fired product).

Figure 3A:
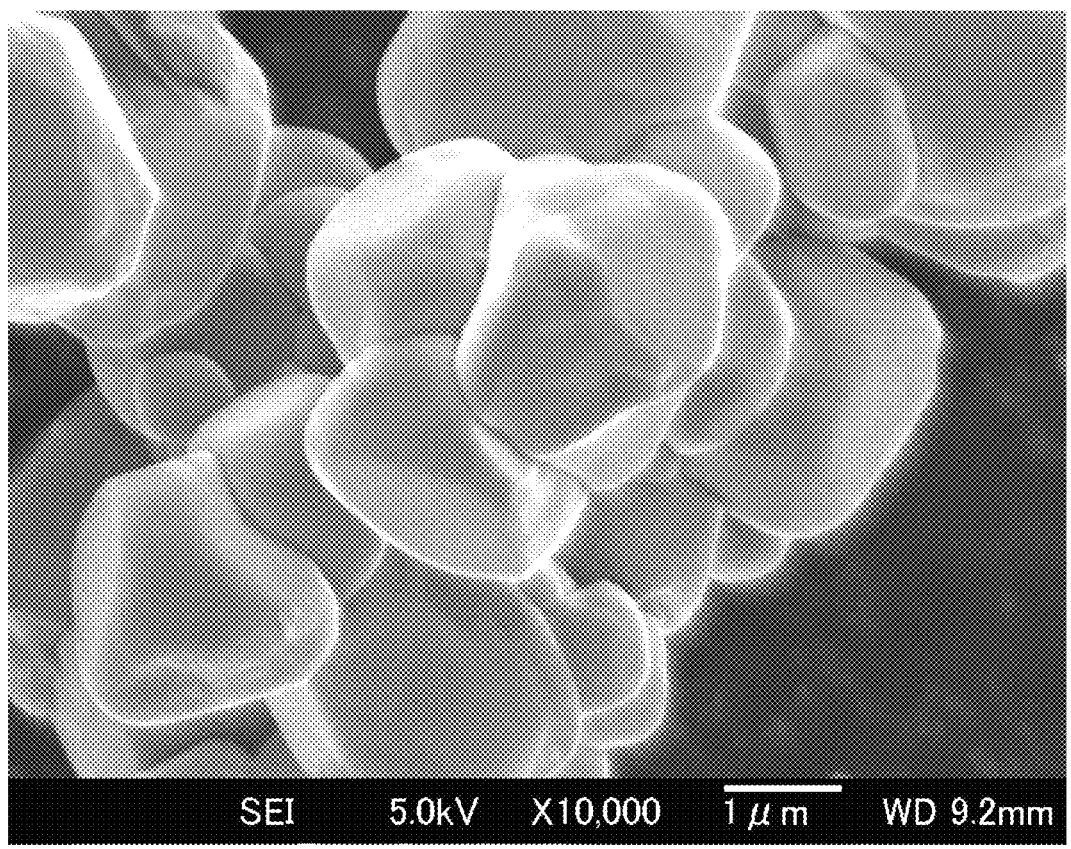
FIG. 3A is an SEM image of the Ni-containing lithium composite oxide A.

FIG. 3A is an SEM image of the Ni-containing lithium composite oxide A. As shown in FIG. 3A, the Ni-containing lithium composite oxide A1 is secondary particles formed by aggregation of the primary particles. The Ni-containing lithium composite oxide A1 had an average particle size of the primary particle of 0.6 μm and an average particle size of the secondary particle of 4.3 μm. The method for measuring the average particle size is as described above.

An X-ray diffraction pattern of the Ni-containing lithium composite oxide A1 obtained by an X-ray diffraction method was analyzed. As a result, the Ni element disorder was 0.5%, and the crystallite size was 144 nm. Conditions for measurement for the X-ray diffraction method and the like are as described above. Calculation of the composition of the Ni-containing lithium composite oxide A1 with an ICP emission spectral analysis (manufactured by Thermo Fisher Scientific K.K., an ICP emission spectral analyzer iCAP6300 was used) resulted in $Li_{1.05}Ni_{0.80}Co_{0.10}Mn_{0.10}O_2$.

[Synthesis of Ni-containing Lithium Composite Oxide B1]

LiOH and $Ni_{0.80}Co_{0.10}Mn_{0.10}(OH)_2$ were mixed such that the molar ratio of Li based on the total amount of Ni, Co, and Mn was 1.05. Thereafter, this mixture was maintained at 780° C. for 20 hours to thereby obtain a Ni-containing lithium composite oxide B1.

Figure 3B:
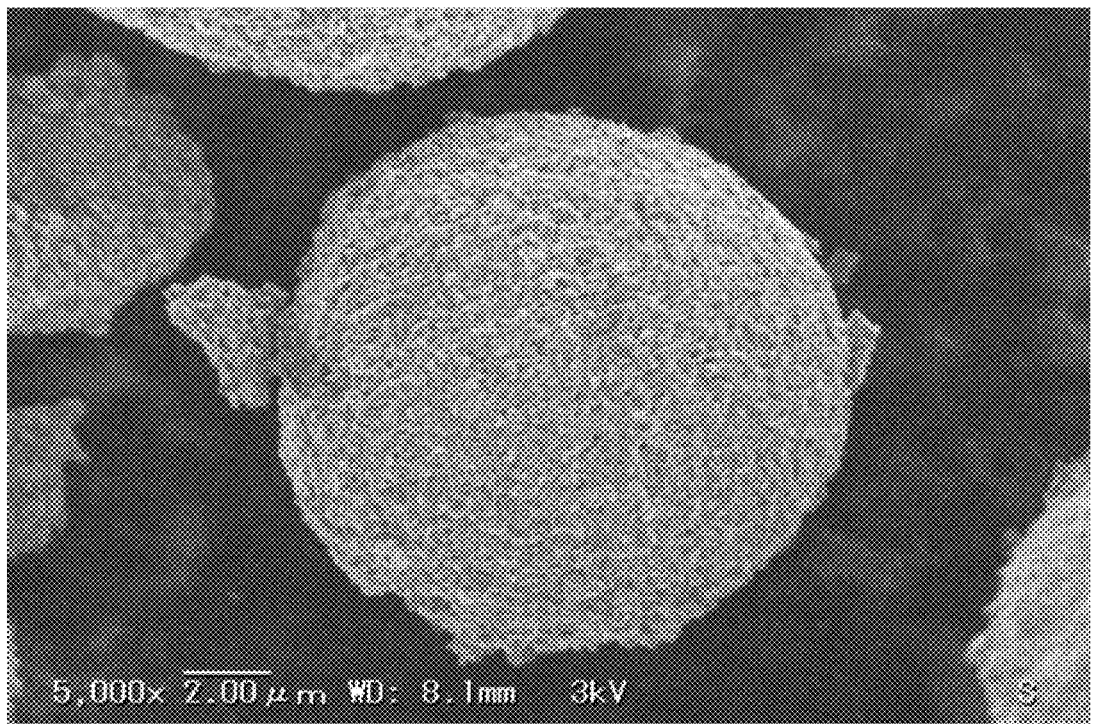
FIG. 3B is an SEM image of the Ni-containing lithium composite oxide B.

FIG. 3B is an SEM image of the Ni-containing lithium composite oxide B1. As shown in FIG. 3B, the Ni-containing lithium composite oxide B1 is secondary particles formed by aggregation of the primary particles as for the Ni-containing lithium composite oxide A1, and the particle size of the primary particle thereof is smaller than that of the Ni-containing lithium composite oxide A1. On the other hand, the particle size of the secondary particle is larger than that of the Ni-containing lithium composite oxide A1. The Ni-containing lithium composite oxide B1 had an average particle size of the primary particles of 0.05 μm and an average particle size of the secondary particle of 13.1 μm.

The Ni element disorder in the Ni-containing lithium composite oxide B1 was 0.4%, and the crystallite size was 121 nm. The composition of the Ni-containing lithium composite oxide B1 was $Li_{1.05}Ni_{0.80}Co_{0.10}Mn_{0.10}O_2$.

[Production of Positive Electrode]

As the positive electrode active material, a mixture of the Ni-containing lithium composite oxides A1 and B1 at a mass ratio of 3:7 was used. Mixed were 97.5 mass % of the positive electrode active material, 1 mass % of carbon black, and 1.5 mass % of polyvinylidene fluoride. This mixture was mixed with N-methyl-2-pyrrolidone (NMP) to prepare a positive electrode mixture slurry. The slurry was coated onto both the surfaces of a positive electrode current collector having a thickness of 15 μm composed of aluminum foil by a doctor blade method. After the coating was dried, the coating was rolled using a rolling roller at a pressure of 500 MPa to produce a positive electrode in which a positive electrode mixture layer was formed on both the surfaces of the positive electrode current collector. A portion at which no positive electrode mixture layer was formed was provided on the center portion in the longitudinal direction of the positive electrode current collector, and a positive electrode tab was attached to the portion. The thickness of the positive electrode mixture layer was set to about 140 μm, and the thickness of the positive electrode was set to about 300 μm.

[Production of Negative Electrode]

Mixed were 98.2 mass % of graphite, 0.7 mass % of styrene-butadiene rubber, and 1.1 mass % of sodium carboxymethyl cellulose. This mixture was mixed with water to prepare a negative electrode mixture slurry. The slurry was coated onto both the surfaces of a negative electrode current collector composed of 8-μm thick copper foil by a doctor blade method. After the coating was dried, the coating was rolled using a rolling roller to produce a negative electrode in which a negative electrode mixture layer was formed on both the surfaces of the negative electrode current collector. A portion at which no negative electrode mixture layer was formed was provided on both the end portions in the longitudinal direction of the negative electrode current collector, and a negative electrode tab was attached to the portions. The thickness of the negative electrode mixture layer was set to about 120 μm, and the thickness of the negative electrode was set to about 250 μm.

[Preparation of Non-aqueous Electrolyte Solution]

To a non-aqueous solvent obtained by mixing equal volumes of ethylene carbonate (EC) and diethyl carbonate (DEC), $LiPF_6$ was dissolved at a concentration of 1.6 mol/L to obtain a non-aqueous electrolyte solution.

[Production of Non-Aqueous Electrolyte Secondary Battery]

The above positive electrode, the above negative electrode, the above non-aqueous electrolyte solution, and a separator were used to produce a non-aqueous electrolyte secondary battery by the following procedures.

(1) The positive electrode and the negative electrode were wound together with the separator therebetween to produce an electrode assembly having a wound structure.

(2) Insulating plates were each disposed above and under the electrode assembly, and the wound electrode assembly was housed in a cylindrical battery exterior can having a diameter of 18 mm and a height of 65 mm.

(3) The current collecting tab of the negative electrode was welded on the inner surface of the bottom of battery exterior can, and simultaneously, the current collecting tab of the positive electrode was welded to the bottom plate of the sealing assembly.

(4) The non-aqueous electrolyte solution was injected from the opening of the battery exterior can. Thereafter, the battery exterior can was sealed with a sealing assembly.

The above non-aqueous electrolyte secondary battery was subjected to performance evaluation by the following methods. The evaluation results were shown in Table 3.

[Evaluation of Discharge Capacity]

The above non-aqueous electrolyte secondary battery was charged at a constant current of 1 It=2900 mA under an environment of 25° C. to a battery voltage of 4.2 V, and thereafter, discharged at a constant current of 1 It to a battery voltage of 2.5 V, and the discharge capacity (mAh) was determined.

[Evaluation of Output Characteristics]

After the above non-aqueous electrolyte secondary battery was charged to 50% of the rated capacity, an output value at a state of charge (SOC) of 50% was determined by the following equation from the maximum current value where charge can be performed for 10 seconds at a battery temperature set at 25° C. and an end-of-discharge voltage of 2 V.

Output value (SOC 50%)=(Maximum current value)×(End-of-discharge voltage (2.0 V))

[Evaluation of Capacity Retention]

The above non-aqueous electrolyte secondary battery was charged and discharged under a temperature condition of 25° C. and under the following conditions, and the capacity retention was determined.

<Charge and Discharge Conditions>

Charge: A constant current charging was conducted at a constant current of 1 It=2900 mA to a battery voltage of 4.2 V. Additionally, a constant voltage charging was conducted at a voltage of 4.2 V until the current value reached 145 mA.

Discharge: A constant current discharging was conducted at a constant current of 1 It to a voltage of 2.5 V.

The cycle consisting of the charge and the discharge was conducted 100 times, and the capacity retention was calculated by the following equation.

capacity retention (%)=discharge capacity at 100th cycle/discharge capacity at first cycle×100

[Evaluation of Amount of Gas]

The above non-aqueous electrolyte secondary battery was charged at a constant current of 1 It=2900 mA under an environment of 25° C. to a battery voltage of 4.2 V. Thereafter, the battery was disassembled, the positive electrode was taken out, and the non-aqueous electrolyte solution attached thereto was removed. Then, 2 mg of the positive electrode active material was scraped off and placed in a temperature-rising heating apparatus. After the inside of apparatus was replaced with inert gas (He gas), the temperature was raised from 25° C. to 500° C. at a temperature elevation rate of 20° C./min. The amount of gas generated from the sample during this period was measured with a gas chromatography-mass spectrometer.

[Synthesis of Ni-containing Lithium Composite Oxides A2 to A10]

Ni-containing lithium composite oxides A2 to A10 were synthesized in the same manner as in the case of the Ni-containing lithium composite oxide A1, except that the amount of Li added and the firing temperature were changed to the conditions shown in Table 1. The average primary particle size, average secondary particle size, Ni disorder, and crystallite size of each of the composite oxides obtained are shown in Table 1.

TABLE 1

| | Ni-containing lithium composite oxide A | | | | | | | |
|---|---|---|---|---|---|---|---|---|
| | Synthesis conditions | | | | | | | |
| | First firing step | | Second firing step | | Primary | Secondary | | |
| | Li molar ratio | Firing temperature (° C.) | Li molar ratio | Firing temperature (° C.) | particle size (μm) | particle size (μm) | Ni disorder (%) | Crystallite size (nm) |
| A1 | 0.90 | 900 | 0.15 | 750 | 0.6 | 4.3 | 0.5 | 144 |
| A2 | 0.85 | 900 | 0.20 | 750 | 0.5 | 4.4 | 0.4 | 132 |
| A3 | 0.95 | 950 | 0.10 | 750 | 1.0 | 4.3 | 2.2 | 189 |
| A4 | 0.95 | 950 | 0.10 | 700 | 0.7 | 2.3 | 0.8 | 172 |
| A5 | 0.85 | 900 | 0.20 | 750 | 0.5 | 5.8 | 0.3 | 119 |
| A6 | 0.95 | 1000 | 0.10 | 750 | 1.2 | 4.9 | 2.9 | 198 |
| A7 | 0.80 | 900 | 0.25 | 750 | 0.4 | 4.2 | 0.3 | 134 |
| A8 | 0.80 | 900 | 0.25 | 700 | 0.3 | 1.9 | 0.1 | 103 |
| A9 | 0.90 | 900 | 0.15 | 800 | 0.7 | 6.2 | 1.0 | 164 |
| A10 | 0.95 | 1000 | 0.10 | 800 | 1.0 | 5.2 | 3.2 | 215 |

[Synthesis of Ni-containing Lithium Composite Oxides B2 to B10]

Ni-containing lithium composite oxide B2 to B10 were synthesized in the same manner as in the case of the Ni-containing lithium composite oxide B1, except that the particle size of the Ni raw material and the firing temperature were changed to the conditions shown in Table 2. The average primary particle size, average secondary particle size, Ni disorder, and crystallite size of each of the composite oxides obtained are shown in Table 2.

TABLE 2

| | Ni-containing lithium composite oxide B | | | | | |
|---|---|---|---|---|---|---|
| | Synthesis conditions | | | | | |
| | Raw material particle size (μm) | Firing temperature (° C.) | Primary particle size (μm) | Secondary particle size (μm) | Ni disorder (%) | Crystallite size (nm) |
| B1 | 13.0 | 780 | 0.05 | 13.1 | 0.4 | 121 |
| B2 | 13.0 | 800 | 0.1 | 13.9 | 0.4 | 130 |
| B3 | 13.0 | 850 | 0.5 | 15.1 | 2.4 | 180 |
| B4 | 9.5 | 800 | 0.2 | 10.1 | 0.7 | 160 |
| B5 | 19.1 | 780 | 0.07 | 19.4 | 0.2 | 110 |
| B6 | 13.0 | 870 | 0.6 | 15.5 | 2.9 | 189 |
| B7 | 14.0 | 750 | 0.04 | 13.9 | 0.1 | 105 |

TABLE 2-continued

| | Ni-containing lithium composite oxide B | | | | | |
|---|---|---|---|---|---|---|
| | Synthesis conditions | | | | | |
| | Raw material particle size (μm) | Firing temperature (° C.) | Primary particle size (μm) | Secondary particle size (μm) | Ni disorder (%) | Crystallite size (nm) |
| B8 | 9.5 | 780 | 0.1 | 9.5 | 0.6 | 129 |
| B9 | 20.0 | 800 | 0.09 | 21.0 | 0.3 | 118 |
| B10 | 13.0 | 900 | 0.1 | 16.2 | 3.3 | 204 |

Examples 2 to 14 and Comparative Examples 1 to 12

Non-aqueous electrolyte secondary batteries were produced and performance evaluation of the batteries was conducted in the same manner as in Example 1, except that, a mixture of the Ni-containing lithium composite oxides A and B shown in Table 3 at a mass ratio shown in Table 3 was used as the positive electrode active material. The evaluation results were shown in Table 3.

TABLE 3

| | Composite oxide A | Composite oxide B | Mass ratio A:B | Discharge capacity (mAh) | Output characteristics (W) | Capacity retention (%) | Amount of gas (cm$^3$) |
|---|---|---|---|---|---|---|---|
| Example 1 | A1 | B1 | 3:7 | 2952 | 72 | 92 | 2.8 |
| Example 2 | A1 | B1 | 2:8 | 2945 | 73 | 93 | 3.2 |
| Example 3 | A1 | B1 | 1:9 | 2910 | 75 | 90 | 3.4 |
| Example 4 | A1 | B1 | 5:5 | 2900 | 70 | 95 | 2,2 |
| Example 5 | A2 | B1 | 3:7 | 2951 | 74 | 90 | 3.1 |
| Example 6 | A3 | B1 | 3:7 | 2940 | 68 | 95 | 1.5 |
| Example 7 | A1 | B2 | 3:7 | 2952 | 71 | 93 | 2.4 |
| Example 8 | A1 | B3 | 3:7 | 2950 | 69 | 94 | 1.9 |
| Example 9 | A4 | B1 | 3:7 | 2930 | 76 | 89 | 3.7 |
| Example 10 | A5 | B1 | 3:7 | 2920 | 70 | 96 | 2.1 |
| Example 11 | A1 | B4 | 3:7 | 2901 | 74 | 90 | 3.2 |
| Example 12 | A1 | B5 | 3:7 | 2964 | 68 | 94 | 2.0 |
| Example 13 | A6 | B1 | 3:7 | 2905 | 69 | 91 | 2.8 |
| Example 14 | A1 | B6 | 3:7 | 2895 | 69 | 92 | 2.7 |
| Comparative Example 1 | A1 | | 10:0 | 2650 | 76 | 98 | 0.7 |
| Comparative Example 2 | | B1 | 0:10 | 2750 | 55 | 80 | 5.0 |
| Comparative Example 3 | A2 | B3 | 3:7 | 2900 | 59 | 96 | 1.1 |
| Comparative Example 4 | A1 | B1 | 6:4 | 2700 | 74 | 90 | 2.1 |
| Comparative Example 5 | A7 | B1 | 3:7 | 2947 | 74 | 85 | 4.6 |
| Comparative Example 6 | A1 | B7 | 3:7 | 2950 | 73 | 85 | 5.4 |
| Comparative Example 7 | A8 | B1 | 3:7 | 2890 | 74 | 84 | 6.0 |
| Comparative Example 8 | A9 | B1 | 3:7 | 2750 | 67 | 94 | 2.3 |
| Comparative Example 9 | A1 | B8 | 3:7 | 2800 | 75 | 83 | 3.9 |
| Comparative Example 10 | A1 | B9 | 3:7 | 2960 | 50 | 94 | 0.9 |
| Comparative Example 11 | A10 | B1 | 3:7 | 2670 | 65 | 89 | 2.1 |
| Comparative Example 12 | A1 | B10 | 3:7 | 2710 | 60 | 88 | 2.8 |

As shown in Table 3, all the batteries of Examples had a high discharge capacity and a high capacity retention, were excellent in output characteristics, and had a small amount of gas generated. In other words, each of the batteries of Examples had a high capacity, was excellent in output characteristics, and had good cyclic characteristics and storage characteristics. In contrast, no battery satisfying all of these characteristics was obtained in Comparative Examples.

REFERENCE SIGNS LIST 10 non-aqueous electrolyte secondary battery
11 positive electrode
12 negative electrode
13 separator
14 electrode assembly
15 battery case
16 exterior can
17 sealing assembly 18, 19 insulating plate
20 positive electrode tab
21 negative electrode tab
22 grooved portion
23 bottom plate
24 lower vent member
25 insulating member
26 upper vent member
27 cap
28 gasket
30 positive electrode current collector
31 positive electrode mixture layer
32, 33 primary particle
40 negative electrode current collector
41 negative electrode mixture layer

The invention claimed is:

1. A positive electrode active material for a non-aqueous electrolyte secondary battery, including Ni-containing lithium composite oxides A and B, wherein
an average primary particle size of the Ni-containing lithium composite oxide A is 0.5 μm or more and is larger than an average primary particle size of the Ni-containing lithium composite oxide B,
an average secondary particle size of the Ni-containing lithium composite oxide A is 2 μm to 6 μm and is smaller than an average secondary particle size of the Ni-containing lithium composite oxide B,
the Ni-containing lithium composite oxide B has an average primary particle size of 0.05 μm or more and an average secondary particle size of 10 μm to 20 μm, and
the Ni-containing lithium composite oxides A and B contain 80 mol % or more of Ni based on a total number of moles of metal elements except for Li, have a crystallite size of 100 nm to 200 nm, and have a Ni element disorder determined by an X-ray diffraction method of 3% or less.

2. The positive electrode active material for a non-aqueous electrolyte secondary battery according to claim 1, wherein
the average primary particle size of the Ni-containing lithium composite oxide A is 0.5 μm to 2 μm, and the average primary particle size of the Ni-containing lithium composite oxide B is 0.05 μm to 0.5 μm.

3. The positive electrode active material for a non-aqueous electrolyte secondary battery according to claim 1, wherein
the Ni-containing lithium composite oxide A is included in an amount of 5 to 55 mass % based on a mass of the Ni-containing lithium composite oxide B.

4. The positive electrode active material for a non-aqueous electrolyte secondary battery according to claim 1, wherein
the Ni-containing lithium composite oxide A is included in an amount of 10 to 50 mass % based on a mass of the Ni-containing lithium composite oxide B.

5. The positive electrode active material for a non-aqueous electrolyte secondary battery according to claim 1, wherein
the Ni-containing lithium composite oxides A and B contain at least one of Co and Mn, and include at least one metal element selected from Mg, Zr, Mo, W, Al, Cr, V, Ce, Ti, Fe, Si, K, Ga, In, and B.

6. A non-aqueous electrolyte secondary battery comprising:
a positive electrode including the positive electrode active material for a non-aqueous electrolyte secondary battery according to claim 1;
a negative electrode; and
a non-aqueous electrolyte.

7. The positive electrode active material for a non-aqueous electrolyte secondary battery according to claim 1, wherein
the Ni-containing lithium composite oxides A and B contain 70 mol % or more of Ni based on the total number of moles of metal elements except for Li.

8. The positive electrode active material for a non-aqueous electrolyte secondary battery according to claim 1, wherein
the Ni-containing lithium composite oxide B has the average secondary particle size of 10.1 μm to 20 μm.

* * * * *